(12) United States Patent
Mai et al.

(10) Patent No.: US 12,524,450 B2
(45) Date of Patent: Jan. 13, 2026

(54) SYSTEM AND METHODS FOR STREAMING STRING SIMILARITY AND PATTERN MATCHING

(71) Applicant: Adobe Inc., San Jose, CA (US)

(72) Inventors: Tung Mai, San Jose, CA (US); Ryan A. Rossi, San Jose, CA (US); Anup Rao, San Jose, CA (US)

(73) Assignee: Adobe, Inc., San Jose, CA (US)

( * ) Notice: Subject to any disclaimer, the term of this patent is extended or adjusted under 35 U.S.C. 154(b) by 107 days.

(21) Appl. No.: 17/835,791

(22) Filed: Jun. 8, 2022

(65) Prior Publication Data

US 2023/0401246 A1 Dec. 14, 2023

(51) Int. Cl.
*G06F 16/334* (2025.01)
*G06F 16/31* (2019.01)
*G06F 16/3332* (2025.01)

(52) U.S. Cl.
CPC .......... *G06F 16/334* (2019.01); *G06F 16/313* (2019.01); *G06F 16/3334* (2019.01)

(58) Field of Classification Search
CPC ... G06F 16/334; G06F 16/3334; G06F 16/313
USPC ........................................................ 707/728
See application file for complete search history.

(56) References Cited

U.S. PATENT DOCUMENTS

| | | | | |
|---|---|---|---|---|
| 2011/0231446 A1* | 9/2011 | Buhler | ................... | G16B 50/00 707/E17.014 |
| 2016/0205101 A1* | 7/2016 | Verma | ................... | G06F 40/284 726/1 |
| 2016/0294802 A1* | 10/2016 | Xiao | ................... | H04L 9/3226 |
| 2017/0371924 A1* | 12/2017 | Ding | ................... | G06F 16/2453 |
| 2019/0034413 A1* | 1/2019 | Rosewell | ............ | G06F 16/2246 |

OTHER PUBLICATIONS

Andoni, A., et al., "Polylogarithmic Approximation for Edit Distance and the Asymmetric Query Complexity", IEEE, pp. 1-10 (2010).

Belazzougui, D., "Edit Distance: Sketching, Streaming and Document Exchange", 57th Annual IEEE Symposium on Foundations of Computer Science, FOCS, pp. 1-31 (2016).

Chakraborty, D., et al., "Streaming algorithms for embedding and computing edit distance in the low distance regime", ACM, In STOC, pp. 1-26 (2016).

Clifford, P., and Clifford, R., "Simple Deterministic Wildcard Matching", Information Processing Letters, vol. 101, Issue 2, pp. 1-3 (2007).

(Continued)

*Primary Examiner* — Thu N Nguyen
(74) *Attorney, Agent, or Firm* — Shook, Hardy & Bacon L.L.P.

(57) ABSTRACT

Embodiments provide systems, methods, and computer storage media for determining string similarity and pattern matching in strings that arrive in a stream. A stream representing string of characters is received and used to compute mapping values that are compared to a mapping value of a query string to identify a match between strings in the stream of characters and the query string. The stream of characters is searched in a single sequential pass to detect a match or the longest matching substring with a query string. An identified match or absence of a match is provided.

20 Claims, 6 Drawing Sheets

(56) References Cited

OTHER PUBLICATIONS

Cole, R., and Hariharan, R., "Verifying Candidate Matches in Sparse and Wildcard Matching", In Proceedings of the thiry-fourth annual ACM symposium on Theory of computing, ACM, pp. 1-10 (2002).

Cormen, T., H., et al., "Introduction to Algorithms", Third Edition, MIT press, pp. 500 (2009) (Part 1).

Cormen, T., H., et al., "Introduction to Algorithms", Third Edition, MIT press, pp. 500 (2009) (Part 2).

Cormen, T., H., et al., "Introduction to Algorithms", Third Edition, MIT press, pp. 313 (2009) (Part 3).

Ergun, F., and Jowhari, H., "On Distance to Monotonicity and Longest Increasing Subsequence of a Data Stream", School of Computing Science, In SODA, pp. 1-7 (2008).

Farhadi, A., et al., "Streaming with Oracle: New Streaming Algorithms for Edit Distance and LCS", arXiv:2002.11342v1, pp. 1-23 (Feb. 26, 2020).

Fischer, M. J., and Paterson, M., S., "String-Matching and Other Products", SIAM-AMS Proceedings, vol. 7, pp. 113-166 (1974).

Gal, A., and Gopalan, P., "Lower Bounds on Streaming Algorithms for Approximating the Length of the Longest Increasing Subsequence", In FOCS, pp. 1-19 (2009).

Gopalan, P., et al., "Estimating the Sortedness of a Data Stream", In SODA, pp. 1-10 (2007).

Indyk, P., "Faster algorithms for string matching problems: matching the convolution bound", In Proceedings 39th Annual Symposium on Foundations of Computer Science, pp. 1-12 (1998).

Kalai, A., "Efficient Pattern-Matching with Don't Cares", In Proceedings of the Thirteenth Annual ACM-SIAM Symposium on Discrete Algorithms, SODA, pp. 655-656 (2002).

Karp, R. M., and Rabin, M. O., "Efficient randomized pattern-matching algorithms", IBM journal of research and development, vol. 31, No. 2, pp. 249-260 (Mar. 1987).

Knuth, D., E., "Fast Pattern Matching in Strings", SIAM journal on computing, vol. 6, No. 2, pp. 323-350 (Jun. 1977).

Liben-Nowell, D., et al., "Finding Longest Increasing And Common Subsequences in Streaming Data", In COCOON, pp. 1-22 (Aug. 2005).

Naumovitz, T., and Saks, M., "A polylogarithmic space deterministic streaming algorithm for approximating distance to monotonicity", Society for Industrial and Applied Mathematics, pp. 1252-1262 (Oct. 8, 2014).

Saks, M., and Seshadhri, C., "Space efficient streaming algorithms for the distance to monotonicity and asymmetric edit distance", In Proceedings of the twenty-fourth annual ACM-SIAM symposium on Discrete algorithms, pp. 1698-1709 (2013).

Sedgewick, R., "Algorithms in Java", Third Edition, Addison Wesley, pp. 300 (2002) (Part 1).

Sedgewick, R., "Algorithms in Java", Third Edition, Addison Wesley, pp. 367 (2002) (Part 2).

Sun, X., and Woodruff, D., P., "The Communication and Streaming Complexity of Computing the Longest Common and Increasing Subsequences", In Proceedings of the eighteenth annual ACM-SIAM, pp. 1-10 (2007).

\* cited by examiner

240 ~ Query String: "FGH"

220A ~ Candidate Substring: "EFG"

260A ~ $f(EFG) = ((69)X10^2 + (70)X10^1 + (71)X10^0) \% 1229$

270A ~ $f(EFG) = ((((f(DEF) - (68)X 10^2 \% 1229)X 10) \% 1229 + (71)) \% 1229$

280A ~ $f(EFG) = 297$

220B ~ Candidate Substring: "FGH"

260B ~ $f(FGH) = ((70)X10^2 + (71)X10^1 + (72)X10^0) \% 1229$

270B ~ $f(FGH) = ((((f(EFG) - (69)X 10^2 \% 1229)X 10) \% 1229 + (72)) \% 1229$

280B ~ $f(FGH) = 408$

FIG. 2

SYSTEM AND METHODS FOR STREAMING STRING SIMILARITY AND PATTERN MATCHING

BACKGROUND

Identifying matching sets of patterns is important in many applications such as data analytics, e-commerce, web analytics, workflow design, and others. Taking data analytics as an example, an analyst may be interested in generating insights using data that may be curated from a number of sources, and which may be structured under different labels, organizations, and/or schemas, and the analyst may want to combine this data by matching similar attribute names, values, and characteristics associated with the data. In another example, pattern matching may involve identifying similar text strings and is useful for searching a large corpus of documents where only a portion of a document in the corpus may be accessed at a particular time. Generally, the concept of pattern matching, or sub-string searching, may encompass searching a text or body of text for occurrences of a particular pattern of interest. Sometimes, occurrences represent a complete match between pattern and a text, while in some contexts, it may be of interest to use pattern matching to find the longest consecutive sequence of characters that appear in both the text and the pattern of interest.

SUMMARY

Embodiments of the present invention are directed to techniques for string similarity and pattern matching. In an example embodiment, data representing text is received as a stream of characters and searched to determine whether a query stream pattern appears in the stream of characters as a sub string. As characters arrive in the stream, a mapping of a sub string of the characters to a value realization is updated and compared to a mapping of the query string pattern to a pattern value realization to determine a match between the sub string of characters and the query string pattern. An indication that the text includes a string that matches the query string pattern is provided.

In an example embodiment, a string matching system identifies strings of characters streamed from a text that match a query string of interest by comparing the values calculated by applying a mapping function (e.g., hash function) to the query string and substrings of characters in the text. For example, text data arriving in the stream is mapped to a numerical value and used to detect string matches in real-time while using sub-linear space (e.g., less than the size of the dataset) and a small per-point processing time. In various implementations, data representing text characters arrive in a stream of data, and a mapping value associated with a substring of one or more of the text characters is quickly updated while using a reduced memory size since storing the entire stream of data to update the mapping value is not necessary to determine whether a string matches a particular query string. In some embodiments, the query string is accessed from random access memory (e.g., local memory) while the text being searched is accessed via a stream.

In some embodiments, mapping substrings of characters arriving in a stream comprises applying a hash function (e.g., a rolling hash function) that maps the substrings of characters from the stream to a unique value that is compared to a value determined by applying the same hash function to a query string of interest (e.g., search term). For example, if the substring of characters and a query string are both mapped to the same value by the hashing function, a match between the substring of characters and the query string is identified. In some cases, as new characters arrive in a stream, a newly arrived character is used to update a previously calculated hash value. For example, a rolling hash algorithm (e.g., Rabin-Karp) uses portions of a previous hash value calculated for a sequence of characters to compute a new hash value associated with the new character. In this way, an updated hash value is efficiently determined as characters are removed and added (e.g., an iteratively updating set of characters) to a current substring of characters being compared to the query string. In some cases, a partial match between a substring of characters in a streamed text and the query string is determined. For example, a longest substring of characters that occur in the query string and the text is determined if a total (e.g., complete) match cannot not be found.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 2 is a data flow diagram illustrating an example rolling map value computation, in accordance with embodiments of the present invention;

DETAILED DESCRIPTION

Overview

Figure 1:
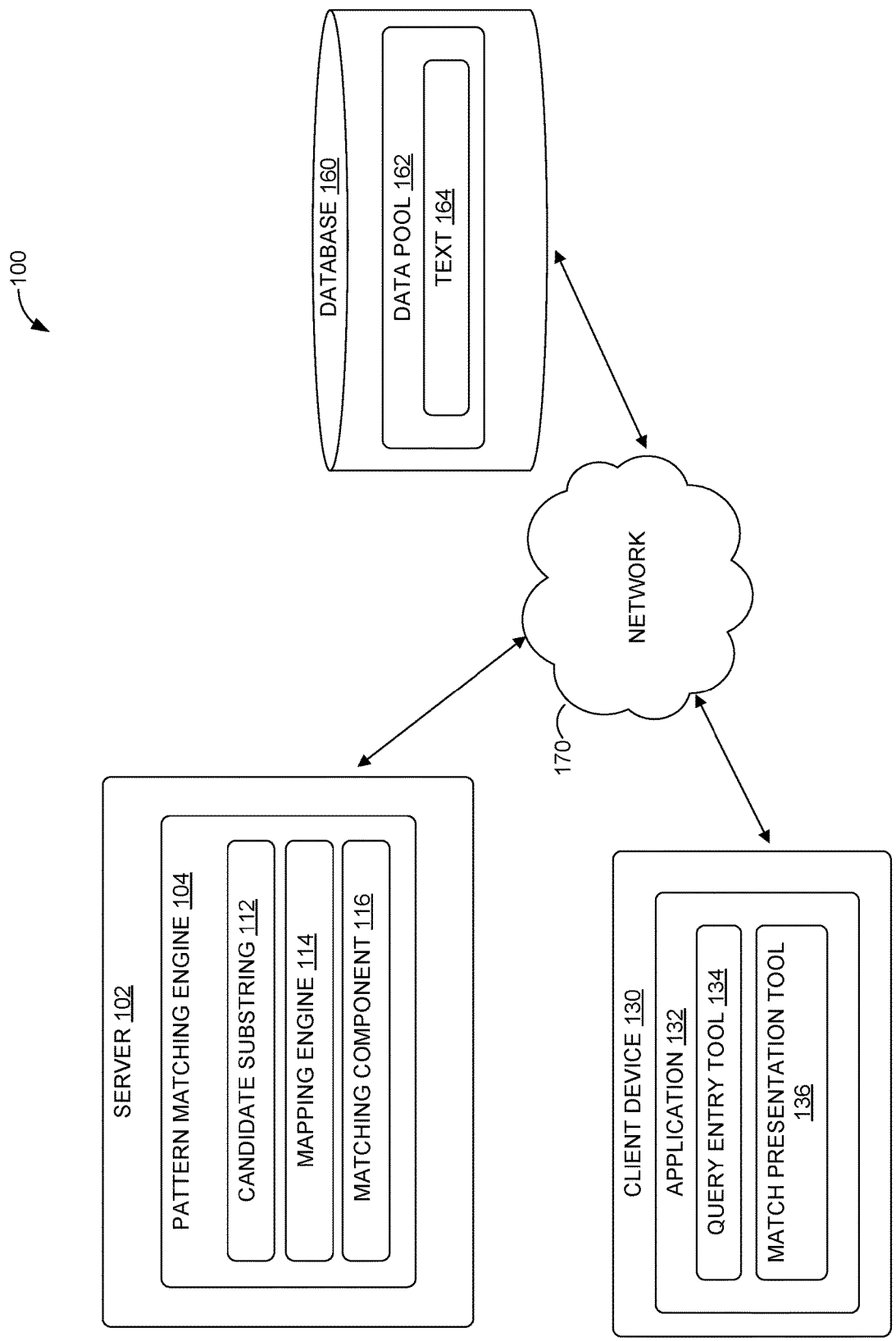
FIG. 1 is a block diagram of an example computing system suitable for pattern matching in strings, in accordance with embodiments of the present invention.

One way to find matching patterns or strings from a collection of text is to perform a string to string comparison between portions of the text. However, since the size of datasets representing the text being searched is often large, significant memory resources are required to analyze the text to identify any potential matches. More specifically, state-of-the-art techniques for pattern matching in text typically require storing and taking multiple passes over a full body of text in memory. As a result, these algorithms typically occupy too much memory to be useful for large scale datasets, where the size of the entire dataset can be much larger than the random-access memory available or that is practical. Furthermore, taking multiple passes over a dataset is impractical where efficient computation is a priority, such as in real-time data analytics systems. Finally, existing techniques are also inefficient in time, space, or and cannot handle large real-world streaming data that arrives continuously over time.

More specifically, some existing techniques leverage specialized data structures to search a text for a matching string. This recent work has relied on suffix array and suffix tree data structures where a data structure corresponding to a string is constructed and subsequently traversed to check if the string contains a particular sub string. However, since these data structures encode more information than the text being searched, they require significant amounts of space (e.g., memory) that are much larger than the size of the text. Some other conventional techniques have implemented algorithms that only require sublinear memory to be available for the algorithm to find matching patterns of text, where the memory required is less that the size of the text being searched. However, these algorithms are focused on the problem of determining an edit distance, or how dissimilar two strings are from each other and these algorithms are not suitable for pattern matching performed over a single pass of a text in an asymmetric streaming setting where there is random access to one string and streaming access to the other string. Further, storing entire sets of data and making multiple passes over the data is inefficient in terms of computation resources required and computational time that is necessary. Additionally, these conventional techniques are not suitable in settings where data is arriving in a stream where large quantities of streaming data arrives continuously over a period of time. Many systems generate or process data serially as new data is added over time. For example, in a data analytics system, data attributes and values may be added to a database over time. In some situations, it is advantageous for data analytics system users to generate real-time and current insights into curated datasets at each increment of time as new data arrives in a data stream without needing to store the information related to each data item in memory. For example, on a cloud-based data analytics systems where data is curated from many different datasets and locations across a distributed network, the memory available on a particular device is limited when compared to the size of the data being analyzed.

Although conventional methods have focused on improving time performance of pattern matching algorithms, existing techniques are fundamentally offline and not amenable to an asymmetric streaming setting. For instance, existing techniques require all data to be stored in memory and are therefore unable to handle asymmetric streaming settings where the full length of a data stream exceeds the size of available memory. Furthermore, since conventional techniques take multiple passes over a dataset, they are impractical for asymmetric streaming settings where time efficient computation of large scale data is more important. Finally, conventional techniques are also inefficient in either time, space, or both and cannot adequately handle large real-world streaming data that arrives continuously over time.

Accordingly, embodiments of the present invention are directed to techniques for pattern matching in strings. In an example embodiment, the disclosed techniques are achieved using a pattern matching system that determines whether text represented by data in a database matches with a query string based on a received stream of character data from the text used to compute a mapping value that is compared with a mapping value corresponding to the query string. In some embodiments where data arrives in a stream, the arriving data represents one or more characters of text. In such an example, the characters are used to generate a candidate sub string of the text that is evaluated as a potential match to a query string. In some embodiments, if no match between a candidate substring and a query string is determined, the candidate substring is updated by discarding one or more characters from the sub string and appending one or more new characters from the stream into the candidate substring. Thus, a single pass is taken to detect matches in the arriving stream of characters while only storing the current candidate substring (e.g., using sub-linear space less than the size of the searched text) in local random access memory.

Embodiments of the present invention are used in a streaming setting, where text data arrives in an arbitrary order and algorithms are constrained to use a single-pass over the data and/or sub-linear memory (i.e. memory that is substantially smaller than the size of the data stream). Additionally or alternatively, embodiments are used in an asymmetric streaming setting where text data arrives in an arbitrary order and algorithms are constrained to use a single-pass over the data and/or sub-linear memory but with the query string (e.g., search pattern) stored in random access memory.

In some examples, identifying a match between a query string and a candidate sub string of a text involves computing a mapping value for the query string and a mapping value for the candidate sub string. A mapping value (e.g., hash value) is a numerical value representing a string of text. Computing a mapping value for a string of text involves applying a mapping function (e.g., hash function) to the string of text, the function evaluating to a mapping value as output. An identical mapping function applied to two identical strings of text should produce the same mapping value for each of the two strings. Because a mapping function applied to two identical strings outputs two equal mapping values, matching strings can be detected by comparing their respective mapping values.

In some examples, a rolling mapping function is applied to a candidate substring of streamed characters. A rolling mapping function uses a previous mapping value calculated for a previous candidate substring to compute a current mapping value for a current candidate substring. For example, as characters arrive in a stream, a rolling mapping function (e.g., rolling hash function) is applied to a candidate substring of length n characters to determine a first mapping value that is used to detect a match with the query string. When a new character arrives in the stream, the candidate substring is updated by removing the first character from the candidate substring and adding the newly arrived character to the end of the candidate substring. In such an example, a mapping value for the updated candidate substring is calculated using the previously calculated first mapping value from the previous candidate substring. Since, previous mapping values are used, the current mapping value is calculated based on only the newly arrived character without having to map other character of the candidate substring.

In embodiments, once a mapping value has been calculated for a candidate sub string of characters from a stream, the mapping value is compared to a query string value associated with the query string. The query string value is determined by applying the mapping function to the query string. In examples where the query string is static and does not change, the query string value need only be computed a single time unlike the mapping value associated with the candidate substring of characters that must be recalculated as the candidate substring is updated with new characters arriving in the stream. A match between the query string and a candidate substring is determined when the mapping values associated with the query string and the candidate substring are equal. In embodiments, an identified match is used to provide an indication that a match between the query string and text (e.g., document, file, etc.) was detected and that the text includes an occurrence of the query string. In some embodiments, the characters of the text arriving in the stream continues to be analyzed for matches after a first match occurrence is detected. For example, the number of match occurrences are counted and provided (e.g., to a user via a user interface). In some examples, when a match between a query string and a text is found, the location (e.g., index, coordinates, line number, position, etc.) of the matching substring in the text is provided (e.g., the first match occurrence is located at the 400th character position of a text).

In some embodiments, when a complete match between a query string and a text cannot be determined, a longest common substring is determined. A longest common substring is a sub string of a searched text that has the greatest number of characters in common with the query string. For example, though the complete query string does not occur in the searched text, a portion of the query string may still occur. In some embodiments, the largest postfix (e.g., a substring of character at the end of a string) of the query string is determined to occur in a searched text associated with a received stream of characters. In some example, the mapping function is applied to a postfix of the query string to determine if the postfix matches any candidate substrings of characters of the text. In some embodiments, when a match is found between a postfix of the query string and a candidate string, the size of the postfix is increased to include an additional character of the query string. The mapping function is applied to the larger postfix of the query string to determine a mapping value that is compared to a mapping value associated with the current candidate string of a size equal to the larger postfix. If a match is detected, the length of the postfix is recorded and/or presented as the longest common substring detected in a text.

As such, embodiments of the present invention provide various technical improvements to the conventional techniques. Since some embodiments take a single pass over large datasets to determine whether matching occurrences of a query string exist in a text, fewer computation resources are required. For example, analyzing large datasets as they stream allows for a more efficient processing in terms of time and complexity. Additionally, the disclosed embodiments for pattern matching do not require storing and taking multiple passes over the full body of text strings in memory which is highly inefficient for large scale data, where the size of the entire text data can be much larger than the random-access memory available. Thus, embodiments of the present invention provide technical improvements in the use of computational and storage resources of a pattern system.

As such, using certain implementations described herein, a system is used to efficiently identify matching patterns in text streams. Although certain uses for pattern matching of strings are discussed, it is not intended to be limiting, and any scenario in which matching strings are identified is contemplated herein. For example, in an implementation in which the pattern matching techniques are used to search in very large documents where only part of the document is loaded into memory. For example, in a distributed cloud computing network of applications, devices, and databases. In certain implementations, the pattern matching techniques are used in applications to find similar attributes within a single dataset and/or across a large collections of datasets. For example, a data analyst may use implementations described herein to find similar datasets, augment existing data with another dataset, or search existing datasets to impute insights regarding the included data. In some implementations, pattern matching is used to generate visualization from large datasets where categorical attribute values are continuously added and arriving in a streaming fashion. In certain implementations, pattern matching of streaming data is used to efficiently provide answers related to customer journey data that represents customer behavior in real-time and predicts future behavior based on detecting matching patterns associated with similar users. In such an implementation, customer journey information arrives in a stream as a sequence of data which requires efficient pattern matching for detecting string similarity for real-time feedback or actions.

Example String Pattern Matching Environment

Referring now to FIG. 1, a block diagram of example environment 100 suitable for use in implementing embodiments of the invention is shown. Generally, environment 100 is suitable for pattern matching in strings and, among other things, facilitates generating an indication of one or more matches between a query string and a stream of text data. At a high level, environment 100 includes client device 130, server 102, database 160, and network 170.

Depending on the implementation, client device 130 and/or server 102 are any kind of computing device capable performing string matching on a stream of data. For example, in an embodiment, client device 130 and/or server 102 are each a computing device such as computing device 600 of FIG. 6. In some embodiments, client device 130 and/or server 102 are a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

In various implementations, the components of environment 100 include computer storage media that stores information including data, data structures, computer instructions (e.g., software program instructions, routines, or services), and/or models (e.g., 3D models, machine learning models) used in some embodiments of the technologies described herein. For example, in some implementations, database 160 comprises a data store (or computer data memory). Further, although depicted as a single data store component, in some embodiments, source database 160 is embodied as one or more data stores (e.g., a distributed storage network) and/or is implemented in the cloud. Similarly, in some embodiments, client device 130 and/or server 102 comprise one or more corresponding data stores, and/or are implemented using cloud storage.

In the example illustrated in FIG. 1, the components of environment 100 communicate with each other via network 170. In some non-limiting example implementations, network 170 includes one or more local area networks (LANs) and/or wide area networks (WANs). Such networking environments are commonplace in offices, enterprise-wide computer networks, intranets, and the Internet.

In the example illustrated in FIG. 1, client device 130 includes application 132 with query entry tool 134 and match presentation tool 136. In some embodiments, query entry tool 134 and match presentation tool 136, and/or any of the elements illustrated in FIG. 1 are incorporated, or integrated, into an application(s), or an add-on(s) or plug-in(s) to an application(s). In some embodiments, the application(s) is a stand-alone application, a mobile application, a web application, or the like. For example, in some implementations, the application(s) comprises a web application that runs in a web browser and/or is hosted at least partially server-side. In some cases, the application is integrated into an operating system (e.g., as a service). Although some embodiments are described with respect to an application(s), some implementations additionally or alternatively integrate any of the functionality described herein into an operating system (e.g., as a service), a server (e.g., a remote server), a distributed computing environment (e.g., as a cloud service), and/or otherwise.

Depending on the embodiment, various allocations of functionality are implemented across any number and/or type(s) of devices. In the example illustrated in FIG. 1, query entry tool 134 and match presentation tool 136 coordinate via network 170 to execute the functionality described herein. In another example, query entry tool 134 and match presentation tool 136 (or some portion thereof) are integrated into a common application executable on a single device. In yet another example, query entry tool 134 and match presentation tool 136 (or some portion thereof) are distributed across some other number and/or type(s) of devices. These are just examples, and any suitable allocation of functionality among these or other devices is possible within the scope of the present disclosure.

The query entry tool 134 includes one or more components that facilitate the input, preparation, parsing, and/or analysis of one or more query strings. For example, the query entry tool 134 receives a query string and related data from a user of the application 132 via a query or search interface. For instance, in certain embodiments, the user inputs one or more search criteria including a particular string or substring of interest. In such an example, a user provides a query string and corresponding search criteria such as particular documents or files to search, date/time information, one or more wildcard characters (e.g., characters for which an exact match is not necessary), and/or any other attribute associated with a search. In other examples, the query entry tool 134 receives multiple query strings for which matches with a portion or all of the query strings are determined.

The match presentation tool 136 includes one or more components that facilitate presentation of an indication of an identified match or partial match of a query string (e.g., input as a query) to a string of characters arriving in a stream. For example, the match presentation tool 136 presents an indication that a string match has been identified and the location or position of that match within the stream of characters being analyzed. In some embodiments, the match presentation tool 136 provides an indication of the first matching string that is identified, while in at least one other embodiment, the match presentation tool 136 provides an indication of one or more matching strings of characters (e.g., having found all instances of matching strings in the stream of characters being analyzed). In embodiments, the number (e.g., a count) of matching strings of a stream or characters is determined and provided by the match presentation tool 136.

The server 102 includes a pattern matching engine 104 comprising a candidate substring 112, a mapping engine 114, and a matching component 116. The pattern matching engine 104 comprises one or more components for performing string matching between a stream of text data and a query string, such as a string received by the query entry tool 134. The pattern matching engine 104 receives a stream of text (e.g., character strings) and determines whether the stream includes one or more matching strings (or partially matching strings). The pattern matching engine 104 receives a stream of characters from the text 164 of data pool 162. As characters arrive in a stream, the pattern matching engine 104 stores a portion of the stream as the candidate substring 112. In certain embodiments, the candidate substring 112 is stored locally to the server 102 and compared to a query string to identify potential matches. As new characters arrive in a stream, the candidate sub string 112 is updated with the newly arriving characters, and discards previously arrived characters to maintain a constant length (e.g., number of characters/words).

Mapping engine 114 comprises one or more components for mapping strings, such as a query string or candidate substring 112 to a mapping value (e.g., map value). For example, mapping engine 114 computes a mapping value for the candidate sub string 112 and a query string so that the corresponding mapping value is analyzed to determine whether the candidate sub string 112 and the query string are matches. In embodiments, the mapping engine 114 applies a hash function to a string to compute the mapping value (e.g., hash value). A rolling mapping function (e.g., a rolling hash function) is applied to the candidate substring to determine the corresponding mapping value. The rolling mapping function is configured to use a previous mapping value calculated for a previous candidate substring to avoid having to apply a mapping function to existing characters of the candidate substring 112. For example, when a new character arrives in the stream, the candidate sub string 112 is updated by removing the first character from the candidate sub string 112 and adding the newly arrived character to the end of the candidate substring 112. In such an example, a mapping value for the candidate substring 112 is calculated using the previously calculated first mapping value from the previous candidate substring.

Matching component 116 comprises one or more components for identifying matches between a query string and candidate sub string 112. For example, based on the mapping values computed by the mapping engine 114, it is determined whether the candidate sub string 112 is a match, or partial match, to a query string provided by the query entry tool 134. In embodiments, identifying matches between a query string and the candidate substring is based on a mapping value associated with the candidate sub string 112 being equal to a mapping value associated with a query string. In some examples, when a match is identified between a query string and the candidate sub string 112, and indication is transmitted to the client device 130 so that the match is presented by the match presentation tool 136. The matching component 116, upon finding a matching candidate substring, determines a location (e.g., index) of the matching sub string within the stream and/or determine a quantity of matching sub strings in the stream. In such an example, the determined location of the match and/or quantity of matching substrings is provided to the client device 130 via the network 170.

Database 160 includes a collection of text 164 in a data pool 162. The data pool 162 includes data representing one or more files and/or documents of text data. The data pool 162. In some embodiments, the text 164 stored in the database 160 is transmitted, via the network 170, to the server 102 as a stream, where characters of the text are transmitted in order and processed by the pattern matching engine 104 as they are received. In some embodiments, the text 164 is used by the pattern matching engine 104 to update the candidate substring 116 as it is received as a stream of characters representing the text 164.

To begin with a high-level overview of an example workflow through the configuration illustrated in FIG. 1, assume a user operating client device 130 is interacting with the application 132 of the client device 130. For example, the user may be interacting with a database application and may be interacting with one or more data tables within the database application. In some embodiments, the user may want to identify similar entries or records in multiple other data sets stored remotely (e.g., on a cloud server). In such an example, the user may provide a query string to the query entry tool 134 of the application 132 that specifies a string of interest to the user. The query string is transmitted to the pattern matching engine 104 of the server 102. Upon receiving a query string, the pattern matching engine 104 retrieves the text 164 from the database 160, the text 164 arriving at the server 102 as a stream of characters. As the characters of the text 164 arrive in a stream, the candidate substring 112 is updated with the characters. For example, the candidate substring 112 is updated such that it includes a most recently received number of characters of a particular length or quantity. As the candidate sub string 112 is iteratively updated, the mapping engine 114 applies a mapping function to the candidate sub string 112 to compute a candidate mapping value. The mapping engine 114 also applies the mapping function to the query string received from the client device 130. In embodiments, the mapping function is applied a single time to the query string in examples in which the query string is constant. Once a mapping value has been computed by the mapping engine 114 for the query string and the current candidate sub string 112, the values are compared by the matching component 116 to identify whether there is a match between the candidate sub string 112 and the query string. In some examples, if a match is identified between the candidate substring 112 and the query string, an indication is transmitted to the client device 130 causing the indication or another indication to be presented using the match presentation tool 136 associated with the identified match such as by using one or more graphical elements of a graphical user interface (GUI). In some examples, if the matching component 116 does not determine a match between the candidate sub string 112 and the query string, an indication that no match was identified is transmitted to the client device 130, causing a correlated indication to be presented by the match presentation tool 136.

Example Rolling Map Techniques

FIG. 2 is an example rolling map value computation 200. The rolling map value computation 200 comprises updating a candidate string with characters of a received stream of characters 210, where the characters of the stream of characters 210 arrive in order over a period of time. As characters of the stream of characters 210 arrive, a candidate substring of characters is updated and analyzed to identify matches between the candidate substring and a query string 240, in this example the query string 240 being "FGH." For example, the candidate substring at a first time 220A (e.g., "EFG") is updated to represent the candidate substring at a second time 220B (e.g., "FGH"), as characters arrive in the stream of characters 210. When a candidate substring is determined, a mapping function is applied to the candidate substring. For example, at the first time, a hash function is applied to the candidate substring at the first time 220A, to compute a first candidate mapping value 260A. In some examples, the first candidate mapping value 260A is computed based on only the current candidate substring. For instance, a mapping function assigns values to each character of a candidate substring and modulating by a randomly chosen prime number. For example, a mapping function may be represented as:

$$f(S[i]) = (c_1 a^{n-1} + c_2 a^{n-2} + \ldots + c_n a^0) \% q \quad \text{(Eq. 1)}$$

Where $f(S[i])$ is the mapping value of the candidate substring $S$ at time $i$, ($c_1 \ldots c_n$) are the characters of the sub string $S$, $a$ represents a base value for the characters, and $q$ is a prime modulus.

For instance, the mapping function of Eq. 1 is applied to candidate substring 220A as follows:

$$f(EFG) = ((69) \times 10^2 + (70) \times 10^1 + (71) \times 10^0) \% \ 1229 \quad \text{(Eq. 2)}$$

Where f(EFG) is the mapping value of the candidate substring 220A, the characters of "E," "F," and "G" are given values of 69, 70, and 71 respectively, and 1229 is a random prime number.

In some examples, a mapping value is computed for a candidate substring using a rolling mapping function, such as a Rabin-Karp algorithm, that uses a previously computed mapping value (e.g., associated with a previous candidate substring) to compute the mapping value for the current candidate substring. For instance, a mapping function assigns values to each character of a candidate substring and modulating by a randomly chosen prime number. For example, a rolling mapping function 270A is applied to candidate substring 220A as follows:

$$f(EFG) = (((f(DEF) - (68) \times 10^2 \% 1229) \times 10) \% \ 1229 + (71)) \% \ 1229 \quad \text{(Eq. 3)}$$

Where f(DEF) is the mapping value of the previous candidate substring "DEF." The term associated with the discarded character "D" is subtracted from the mapping value, while the term associated with the newly arrived character "G" is added to the expression for the updated candidate sub string 220A.

Similar to the previous example, then the candidate substring at the first time 220A is updated to the candidate substring at the second time 220B, an updated mapping value 260B can be determined for the updated candidate sub string 220B. In some embodiments, the mapping value for the candidate substring 220B is computed independently of computed mapping values for other candidate substring such as by applying mapping function 260B as follows:

$$f(FGH) = ((70) \times 10^2 + (71) \times 10^1 + (72) \times 10^0) \% 1229 \quad \text{(Eq. 4)}$$

Where f(FGH) is the mapping value of the candidate substring 220B, the characters of "F," "G," and "H" are given values of 70, 71, and 72 respectively, and 1229 is a random prime number.

Similar to the example above, a mapping value is computed for a candidate sub string using a rolling mapping function, such as rolling mapping function 270B, that uses the previously computed mapping value (e.g., associated with previous candidate substring "EFG") to compute the mapping value for the current candidate substring 220B. For example, a rolling mapping function 270B is applied to candidate substring 220B as follows:

$$f(FGH) = (((f(EFG) - (69) \times 10^2 \% 1229) \times 10) \% 1229 + (72)) \% 1229 \quad \text{(Eq. 5)}$$

Where f(EFG) is the mapping value of the previous candidate substring "EFG," as computed in Eqs. 2 or 3. The term associated with the discarded character "E" is subtracted from the mapping value, while the term associated with the newly arrived character "H" is added to the expression for the updated candidate substring 220B.

Once a mapping value has been computed for a candidate substring by applying a mapping function or a rolling mapping function, the mapping value can be compared to a mapping value associated by applying the same function to the query string 240. For example, if the mapping value associated with the candidate substring is equal to the mapping value associated with the query string, a match is identified. For instance, the mapping value 280B for candidate substring 220B (i.e., 408) is equal to the mapping value associated with the query string 240, indicating a match, while the mapping value 280A for candidate substring 220A (i.e., 297) does not equal the mapping value associated with the query string 240 and no match exists.

Example String Mapping Techniques

Figure 3:
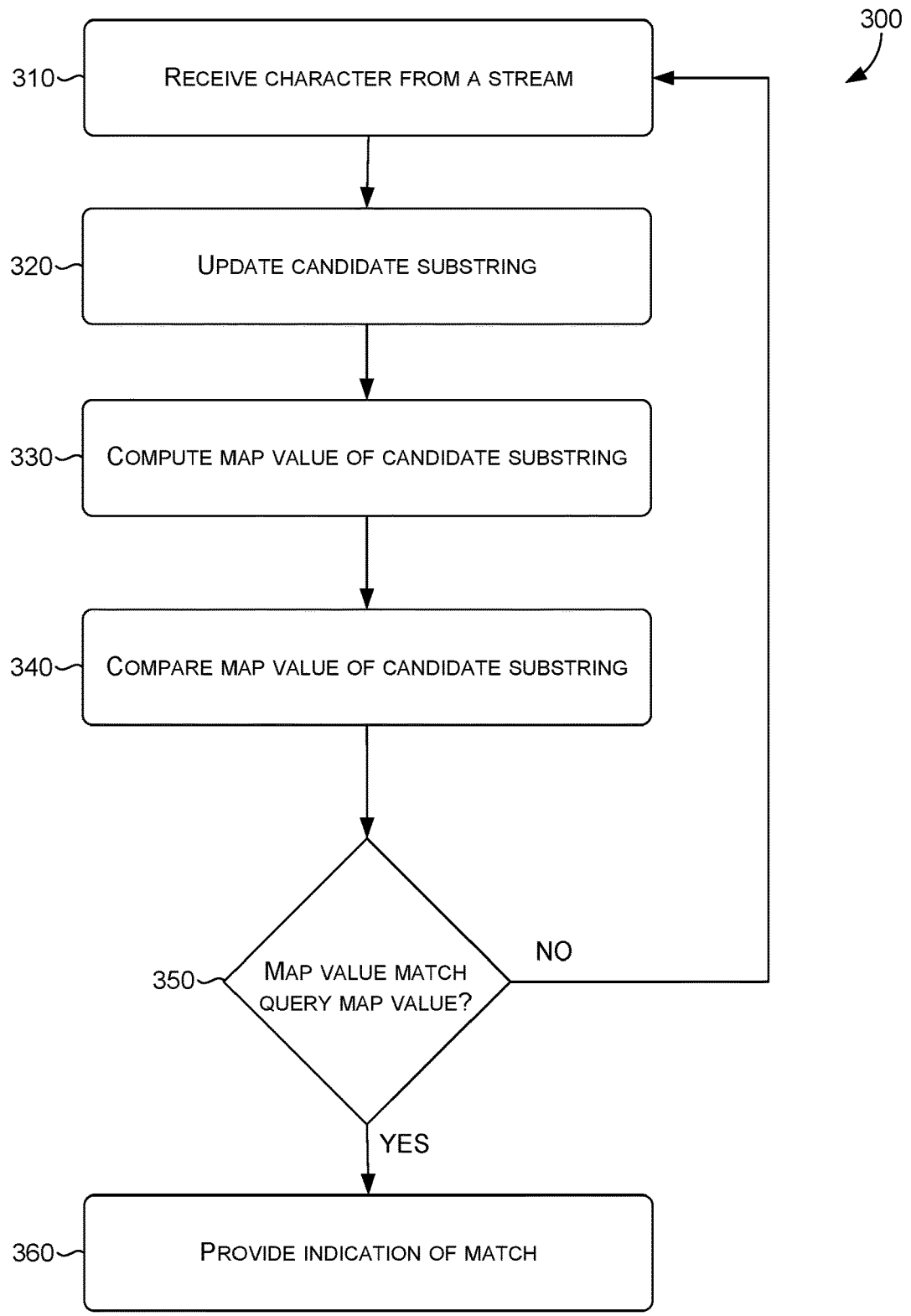
FIG. 3 is a data flow diagram illustrating an example pattern matching module, in accordance with embodiments of the present invention.

FIG. 3 is a data flow diagram illustrating an example pattern matching module 300. In some embodiments, pattern matching module 300 and its components correspond with pattern matching engine 104 of FIG. 1 and its components.

Generally, pattern matching module 300 receives characters from a stream of character 310. In some embodiments, the characters received from the stream are used to update a candidate substring 320. For example, the candidate substring 112 of FIG. 1, is updated with the newly received characters. In embodiments, characters in the candidate substring are discarded, or otherwise, removed from the updated candidate substring.

Once the candidate string has been updated, a map value of the candidate substring is computed 330. In some embodiments, the map value for the candidate substring is computed by applying a mapping function to the candidate substring.

In some embodiments, the map value of the candidate substring is compared to a query map value corresponding to a query string 340. In embodiments, it is determined whether the map values matches the query map value 350. If a match between the map value and the query map value is identified, an indication of the match is provided 360. In cases where the map value does not match the query map value, the candidate substring is iteratively updated with newly received characters from the stream.

Example Flow Diagrams

Figure 4:
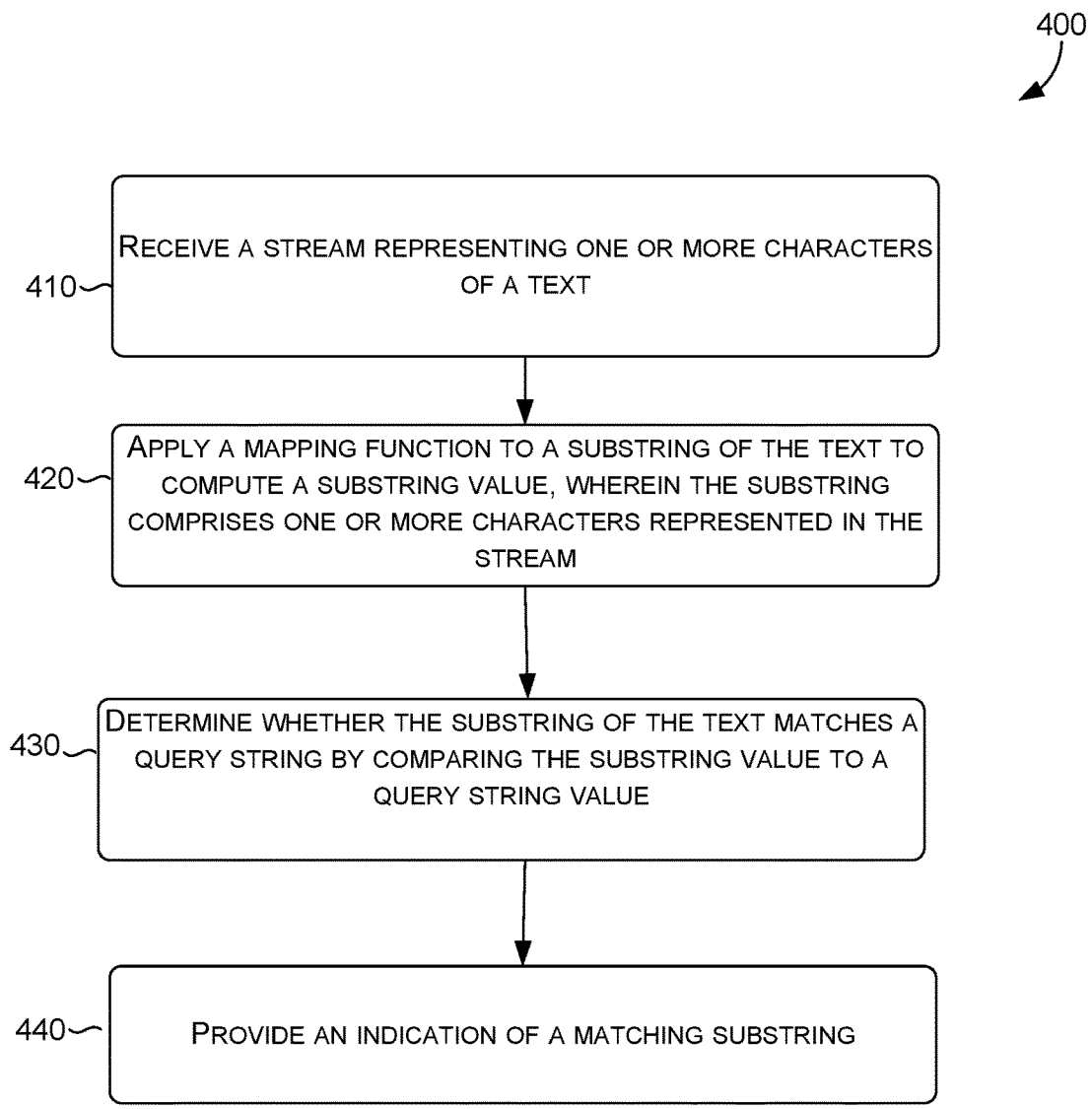
FIG. 4 is a flow diagram showing a method for determining similarity between strings, in accordance with embodiments of the present invention.
Figure 5:
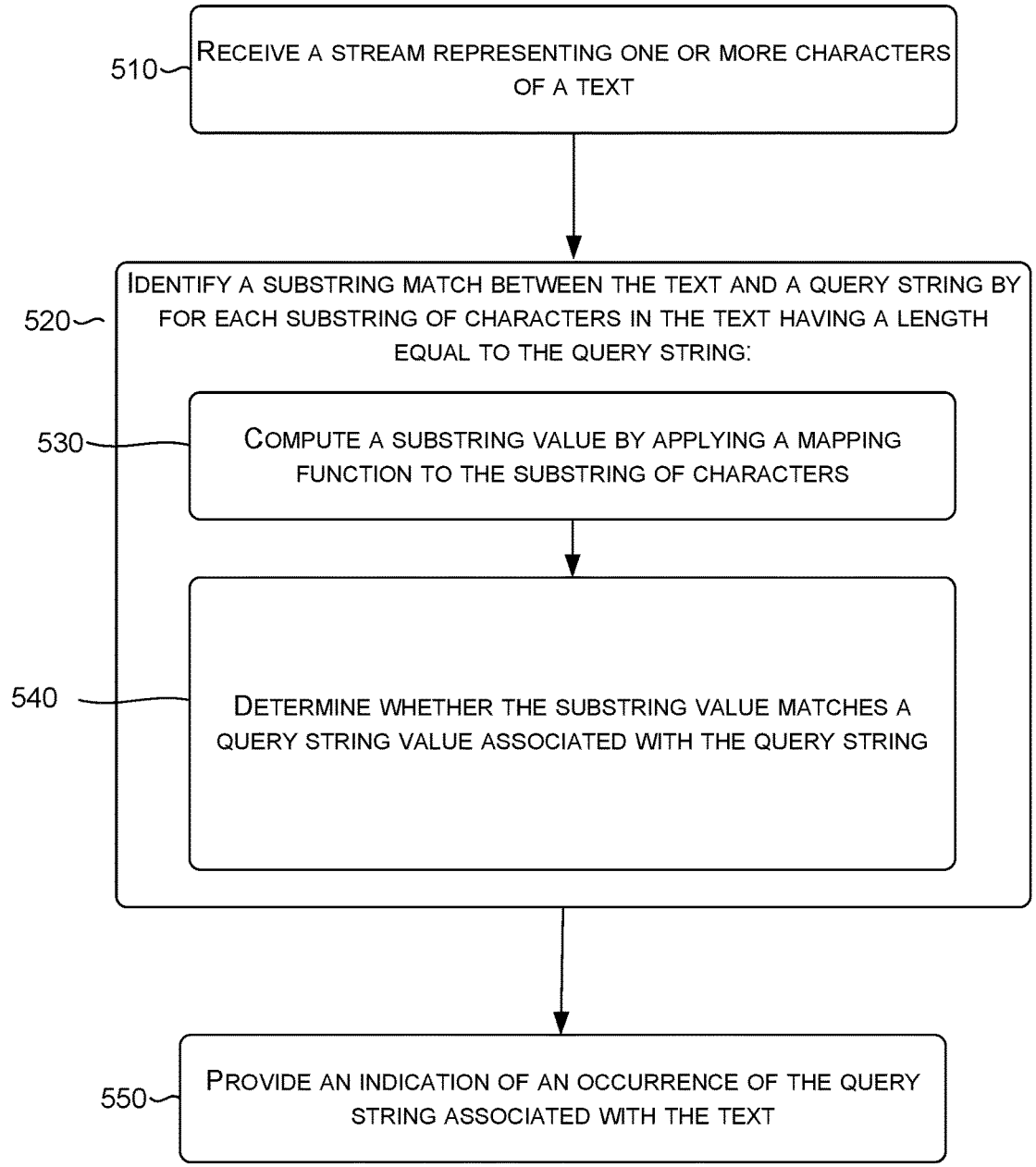
FIG. 5 is a flow diagram showing a method for pattern matching in strings, in accordance with embodiments of the present invention.

With reference now to FIGS. 4-5, flow diagrams are provided illustrating various methods determining similarity and pattern matching in strings. Each block of the methods 400 and 500 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

Turning initially to FIG. 4, FIG. 4 illustrates a method 400 for determining similarity between strings, in accordance with embodiments described herein. Initially at block 410, a stream representing one or more characters of a text is received. At block 420, a mapping function is applied to a substring comprising one or more characters represented in the stream of the text to compute a substring value. At block 430, the substring value is compared to a query string value to determine whether the substring of the text matches a query string. At block 440, and indication of a matching sub string is provided.

Turning now to FIG. 5, FIG. 5 illustrates a method 500 for pattern matching in strings, in accordance with embodiments described herein. Initially at block 510, a stream representing one or more characters of a text is received. At block 520, a substring match between the text and a query string is identified by—at block 530—for each substring of characters in the text having a length equal to the query string, a substring value is computed by applying a mapping function to the substring of characters, and—at block 540— it is determined whether the substring value matches a query string value associated with the query string. At block 550, an indication of an occurrence of the query string associated with the text is provided.

Example Operating Environment

Figure 6:
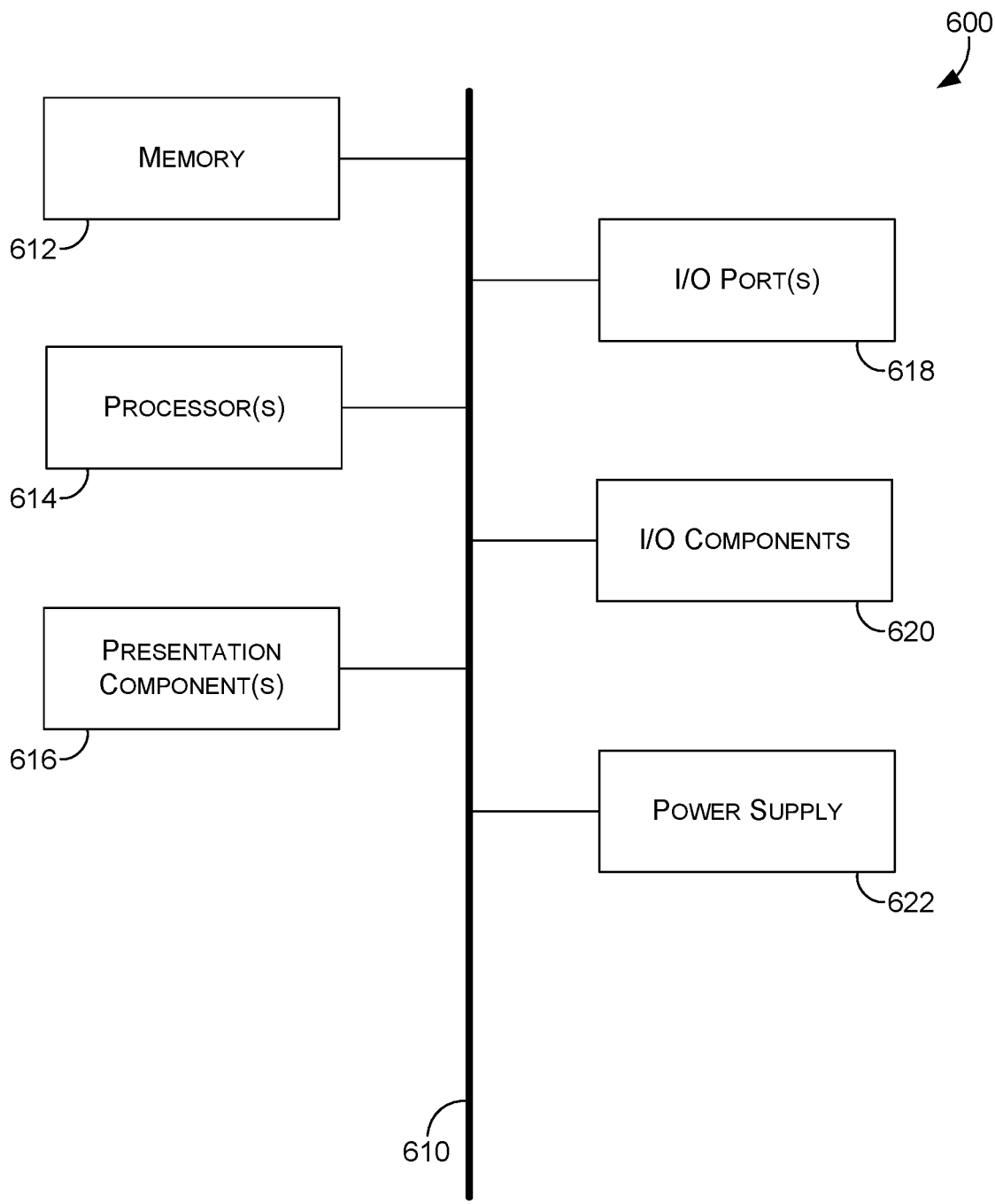
FIG. 6 is a block diagram of an example computing environment suitable for use in implementing embodiments of the present invention.

Having described an overview of embodiments of the present invention, an example operating environment in which some embodiments of the present invention are implemented is described below in order to provide a general context for various aspects of the present invention. Referring now to FIG. 6 in particular, an example operating environment for implementing embodiments of the present invention is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

In some embodiments, the present techniques are embodied in computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. Various embodiments are practiced in a variety of system configurations, including hand-held devices, consumer electronics, general-purpose computers, more specialty computing devices, etc. Some implementations are practiced in distributed computing environments where tasks are performed by remote-processing devices that are linked through a communications network.

With reference to the example operating environment illustrated in FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in some cases, it is not possible to delineate clear boundaries for different components. In this case, metaphorically, the lines would be grey and fuzzy. As such, the diagram of FIG. 6 and other components described herein should be understood as merely illustrative of various example implementations, such as an example computing device implementing an embodiment or a portion thereof. Distinction is not made between such categories as "workstation," "server," "laptop," "hand-held device," etc., as all are contemplated within the scope of FIG. 6 and a "computing device."

Computing device 600 typically includes a variety of computer-readable media. Computer-readable media can be any available media that can be accessed by computing device 600 and includes both volatile and nonvolatile media, and removable and non-removable media. By way of non-limiting example, in some cases, computer-readable media comprises computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. In various embodiments, the memory is removable, non-removable, or a combination thereof. Example hardware devices include solid-state memory, hard drives, optical-disc drives, etc. Computing device 600 includes one or more processors that read data from various entities such as memory 612 or I/O components 620. Presentation component(s) 616 present data indications to a user or other device. Example presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs are transmitted to an appropriate network element for further processing. In some embodiments, an NUI implements any combination of speech recognition, stylus recognition, facial recognition, biometric recognition, gesture recognition both on screen and adjacent to the screen, air gestures, head and eye tracking, and/or touch recognition (as described in more detail below) associated with a display of computing device 600. In some cases, computing device 600 is equipped with depth cameras, such as stereoscopic camera systems, infrared camera systems, RGB camera systems, touchscreen technology, and combinations of these, for gesture detection and recognition. Additionally or alternatively, the computing device 600 is equipped with accelerometers or gyroscopes that enable detection of motion, and in some cases, an output of the accelerometers or gyroscopes is provided to the display of computing device 600 to render immersive augmented reality or virtual reality.

Embodiments described herein support determining similarity and pattern matching in strings. The components described herein refer to integrated components of string similarity and pattern matching system. The integrated components refer to the hardware architecture and software framework that support functionality using the string similarity and pattern matching system. The hardware architecture refers to physical components and interrelationships thereof and the software framework refers to software providing functionality that can be implemented with hardware embodied on a device.

In some embodiments, the end-to-end software-based system operates within the components of the string similarity and pattern matching system to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. In some cases, low-level software written in machine code provides more complex functionality to higher levels of software. As used herein, computer-executable instructions includes any software, including low-level software written in machine code, higher level software such as application software and any combination thereof. In this regard, system components can manage resources and provide services for the system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   receiving an asymmetric stream of data representing a plurality of characters of a text received in an arbitrary order;
   determining a longest common substring between a substring of the text and a query string by at least:
   storing the query string to a local memory;
   applying a mapping function to the substring of the text and a postfix of the query string to compute a substring value and a query string value, the substring comprises one or more characters represented in the asymmetric stream, and a length of the substring corresponds to a postfix of a query string, wherein the mapping function is a rolling hash;
   determining the substring of the text matches the query string by comparing the substring value to a query string value associated with the query string; and
   as a result of determining that the substring of the text does not matches the query string, increasing a size of the postfix of the query string; and
   based on determining the substring value matches the postfix query value, providing an indication of the substring.

2. The one or more computer storage media of claim 1, wherein the operations limit processing of the one or more characters of the text to a single sequential pass of the one or more characters of the text.

3. The one or more computer storage media of claim 1, wherein the query string value is calculated by applying the mapping function to the postfix of the query string.

4. The one or more computer storage media of claim 1, wherein the indication of the substring comprises a location of the substring in the text.

5. The one or more computer storage media of claim 1, the operations further comprising:
   based on determining that the substring of the text does not match the query string, generating an updated substring by removing a first character of the substring and including in the substring a next character from the characters represented in the stream; and
   updating the substring value by applying the mapping function to the updated substring.

6. The one or more computer storage media of claim 1, wherein determining whether the substring of the text matches the query string comprises finding a longest sequence of characters that occur in the substring of text and to the postfix of the query string.

7. A computerized method comprising:
   receiving a stream representing one or more characters of a text;
   identifying a substring match between the text and a postfix of a query string by, for each substring of characters in the text having a length equal to the postfix of the query string:
   (i) computing a substring value by applying a mapping function to the substring of characters, wherein the mapping function is a rolling hash;
   (ii) determining whether the substring value matches a query string value associated with postfix of the query string; and
   (iii) in response to determining the substring value does not match the query string value associated with postfix of the query string, increasing a length of the postfix; and
   based on determining whether the substring value matches the query string value, providing an indication of an occurrence of the query string associated with the text.

8. The computerized method of claim 7, wherein computing the substring value comprises initializing a baseline substring value or updating a previous computed substring value by applying the mapping function to a previous substring of characters and one or more characters of the substring of characters.

9. The computerized method of claim 7, wherein identifying a substring match between the text and the query string limit processing of the one or more characters of the text to a single sequential pass of the one or more characters of the text.

10. The computerized method of claim 7, wherein the indication of the occurrence of the query string associated with the text comprises a numerical representation of a location of the query string in the text.

11. The computerized method of claim 7, wherein the query string value is calculated by applying the mapping function to the postfix of the query string.

12. The computerized method of claim 7, wherein the identifying a substring match between the text and the query string comprises finding a longest sequence of characters that occur in the text and the postfix of the query string.

13. The one or more computer storage media of claim 7, the identifying the substring match between the text and a query string comprises storing the substring of characters to a local memory having a size less than a size of the text.

14. A computerized system comprising:
   one or more hardware processors and memory configured to provide computer program instructions to the one or more hardware processors;
   a substring processing engine configured to use the one or more hardware processors to detect, from a text obtained in a stream including a plurality of characters of a text received in an arbitrary order, a substring of characters of the text that matches at least a postfix of a query string, based at least on limiting processing of characters of the text to a single sequential pass of characters streamed from the text, wherein the substring processing engine, as a result of determining that the substring of characters does not matches the query string, uses a mapping function that applies a previously calculated hash values and at least one additional character from the substring of characters to determine a match with the postfix of the query string, where the query string is stored in the memory and the mapping function is a rolling hash; and
   a recommendation component configured to use the one or more hardware processors to cause a user interface to present a representation of one or more substrings of characters of the text that match the query string.

15. The computerized system of claim 14, wherein processing of characters of the text comprises:
based on determining that the substring of the text does not match the query string, generating an updated substring by updating the substring by removing a first character of the substring and including a next character from the characters streamed from the text; and
updating a substring value computed for the substring by applying a mapping function to the updated substring.

16. The computerized system of claim 15, wherein the mapping function is a rolling hash.

17. The computerized system of claim 14, wherein the substring processing engine is further configured to use the one or more hardware processors to detect the substring of characters of the text that matches the query string substring comprises finding a longest sequence of characters that occur in the text and the postfix of the query string.

18. The one or more computer storage media of claim 1, wherein the rolling hash function is a Rabin-Karp function.

19. The computerized method of claim 7, wherein the computerized method further comprises:
determining that the substring of the text does not match the query string;
generating an updated substring by removing a first character of the substring and including in the substring a next character from the characters represented in the stream; and
updating the substring value by applying the mapping function to the updated substring.

20. The one or more computer storage media of claim 1, wherein the substring is obtained from the asymmetric stream and not stored in the local memory.

* * * * *